United States Patent [19]

McDonnell et al.

[11] 4,396,800

[45] Aug. 2, 1983

[54] MICROPHONE SWITCHING DEVICE

[75] Inventors: Edward J. McDonnell; George Van Houten, both of Las Vegas, Nev.

[73] Assignee: Edward J. McDonnell, Las Vegas, Nev.

[21] Appl. No.: 192,486

[22] Filed: Sep. 30, 1980

[51] Int. Cl.[3] .............................................. H04M 9/00

[52] U.S. Cl. ............................... 179/1 H; 179/1 SW; 179/37

[58] Field of Search ........................... 455/57, 77, 352; 179/1 R, 1 AT, 1 B, 1 H, 1 SW, 1 VC, 29, 37, 156 R, 167

[56] References Cited

U.S. PATENT DOCUMENTS

| | | | |
|---|---|---|---|
| 3,035,132 | 5/1962 | Gorike et al. | 179/1 SW X |
| 3,870,829 | 3/1975 | Chacon | 179/1 H X |
| 4,087,653 | 5/1978 | Frieder, Jr. et al. | 179/156 R |

FOREIGN PATENT DOCUMENTS

| | | | |
|---|---|---|---|
| 1,038,421 | 10/1966 | United Kingdom | 179/167 |

*Primary Examiner*—Joseph A. Popek
*Attorney, Agent, or Firm*—Wagner & Bachand

[57] ABSTRACT

Apparatus allowing a performer on stage using a microphone to communicate privately backstage during a performance with minimum or unobservable interruption to the audience. A miniature switch on an attachment to the microphone handle when actuated via the communications channel operates a relay or switching device to transfer communications from the performer's microphone to a backstage intercommunication system while temporarily disconnecting the microphone from the public address system. The attachment constituting a minor extension to the microphone handle enabling a self contained battery and resistance network to provide operating current to a switching relay. One or more visual indicators signal operation of the apparatus to backstage personnel alerting them to a forthcoming performer message.

15 Claims, 4 Drawing Figures

MICROPHONE SWITCHING DEVICE

BACKGROUND OF THE INVENTION

Performers on stage from time immemorial have faced the problem of inability to communicate with his backstage support personnel. Performances have been adversely affected by improper lighting, sound system malfunctions and other difficulties noted by the performer and the audience but not recognized by backstage personnel. The performer has been virtually helpless to signal backstage without resorting to leaving the stage, sidebar comments or hand or body signals which are likely to be noticeable and disturbing to the audience.

When the performer uses a microphone the problem is not aided since sidebar comments are likely to be picked up by the microphone and amplified for the entire audience. In the past, microphones have often had switches which open circuit the microphone. However, the control of a backstage intercommunication system by the stage microphone is unknown to the applicants.

BRIEF DESCRIPTION OF THE INVENTION

Faced with this continuing need, we have developed a system for unobtrusive communications between a performer employing a simple adapter which is mechanically and electrically connected between the microphone and its associated cable as an extension to the microphone handle. The adapter includes mating connectors for the microphone and cable, a momentary switch, a power source for supplying a non audio frequency signal and a resistance network for introducing a predetermined signal on the microphone cable conductors indicative of the performer's operation of the switch and need for intercommunication. A control unit is interconnected between the microphone cable, the normal public address system and the intercommunication system. The control unit is passive during normal operation of the public address system and, responsive to operation of the momentary switch, transfers the microphone connection from the public address system to the intercommunication system. The control unit also provides approximately 60 db of gain to the intercommunication signal for the signal to insure adequate level. One or more visual indicators are energized by the control unit during intercommunication operation to alert backstage personnel.

BRIEF DESCRIPTION OF THE DRAWING

This invention may be more clearly understood from the following detailed description by reference to the drawings in which.

DETAILED DESCRIPTION OF THE INVENTION

Figures 1, 2, 3:
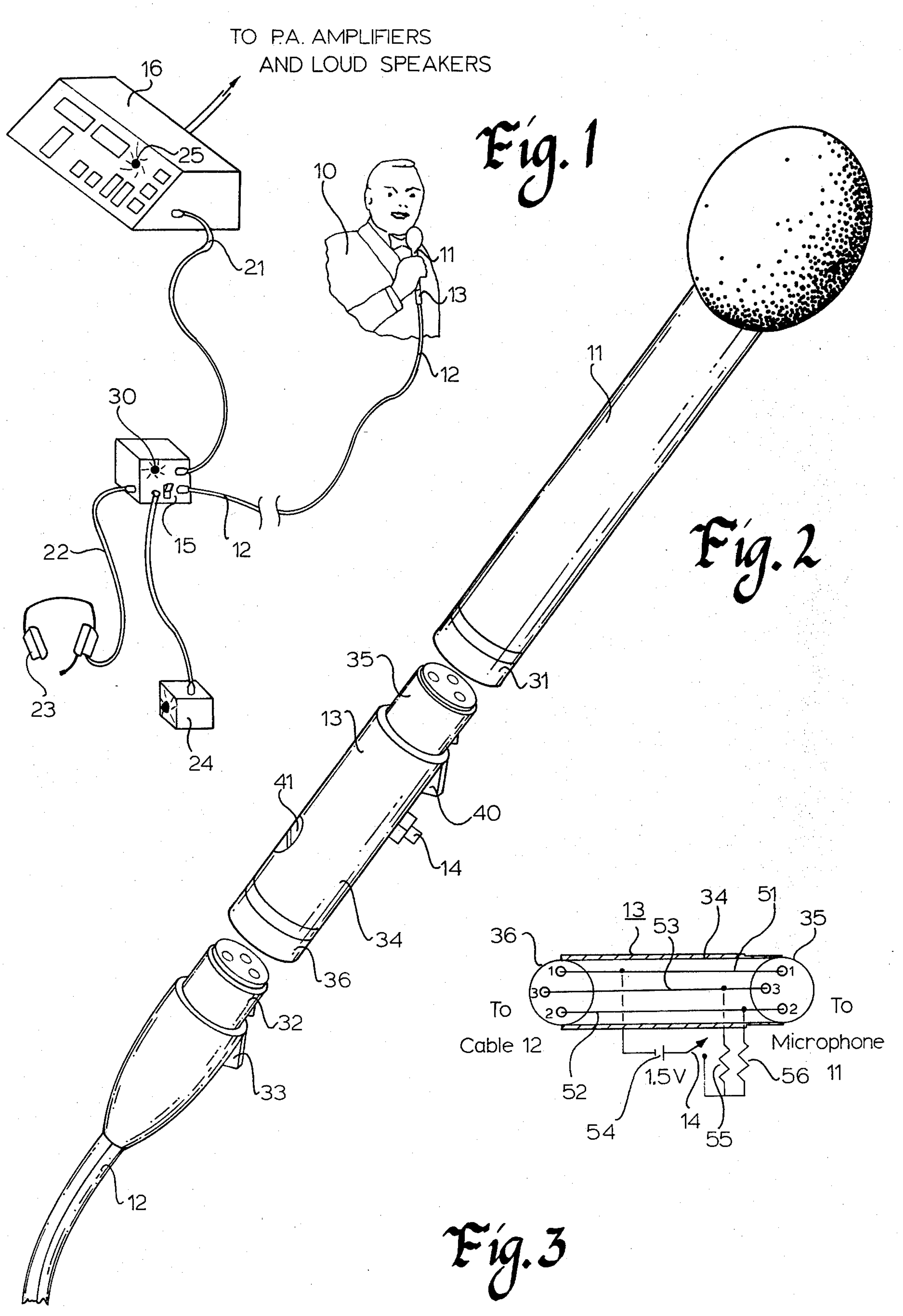
FIG. 1 is a perspective view of the apparatus of this invention in use.
FIG. 2 is a perspective view of a microphone and cable with this invention shown exploded therefrom.
FIG. 3 is an electrical schemetic diagram of the microphone attachment of this invention.

The system of this invention in operation is shown in operation in FIG. 1 which illustrates a performer 10 holding a microphone 11 including a normal microphone cable 12 and an adapter 13 of this invention constituting a microphone handle extension. The presence of the adapter 13 is hardly noticeable. Concealed by the performer 10's hand is a press to talk switch 14 unshown in FIG. 1 but appearing in FIG. 2.

The cable 12 is connected to a control unit 15 normally located backstage in proximity to the main control console 16 for the public address system used by the performer 10. The control unit 15 and main console 16 are interconnected via cable 21 through which the microphone 11 is normally connected and the normal audio signal passes to public address amplifiers and speakers unshown but normally associated with and under the control of the console 16 operator.

The control unit 15 also is connected via cable 22 to the intercommunication system of the installation which is represented by a pair of ear phones 23 and microphones but in fact may include a dozen or more individuals each having two way communications access. An optional remote visual indicator 24 is located near one or more intercommunication system stations signalling the operation of the switch 14. The main control console 16 is a typical location of such a remote indicator as represented by light emitting diode or lamp 25 on the console panel in front of the console operators. The control unit 15 likewise includes a visual indicator 30. The use of this system may involve the placement of the control unit 15 near the console 16 where its indicator 30 is visible to the console 16 operator. In such a case no alteration of the existing public address or intercommunication system equipment is required, only plugging in compatible plugs to existing jacks.

The compatibility of this apparatus is particularly clear by reference to FIG. 2 showing the microphone 11 which normally has in its base a recessed 3-prong Cannon type male plug connector 31 into which a matching female connector 32 terminating cable 12 is connected. Often these connectors include a spring actuated locking mechanism and external release lever 33 shown on the side of connector part 32. The locking mechanism prevents inadvertent release of cable 12.

The adapter 13 of this invention preferably has a body portion 34 of diameter matching the diameter of the handle of microphone 11. The adapter includes a matched pair of Cannon type or other compatible connectors 35 and 36. Connector 35 matches and mates with microphone connector 31 and connector 36 matches and mates with connector 32. Connector 35 includes a spring lock mechanism and release lever 40 similar to the locking mechanism of connectors 32 and its release lever 33.

It is clear that mechanically the adapter 13 of this invention is but a minor extension on an existing standard microphone. The connectors of adapter 13 are selected to match the connectors of the microphone, the Cannon type connector being representative of suitable connectors but in no way so limited. Likewise this invention may be permanently incorporated in the microphone, however, the separate adapter of this invention eliminates any need for microphone redesign and allows its removal when not needed or desired.

The microphone adapter case 34 also includes an access opening and closure 41 for an internal battery used to operate this invention.

Referring now to FIG. 3, the preferred contents of adapter 13 and the electrical schematic thereof may be seen. The three female contacts of connector 35 labelled 1, 2, and 3 are connected to similar male contacts 1, 2, and 3 of connector 36 by respective straight through insulated conductors 51, 52, and 53. Thus, the adapter 13 is electrically transparent to the normal speech path from the microphone leads 1, 2, and 3 to the similar conductors 1, 2, and 3 of cable 12.

Contained within housing 34 in addition to the straight through conductors are a battery 54, switch 14 and a pair of resistances 55 and 56. The battery 54 which may be of the miniature button type 1.5 v type supplies a direct current signal which is applied to both signal conductors 52 and 53 in parallel with the return route path through conductor 54. The direct current signal does not affect the microphone 11. The direct current signal e.g. milliamperes on each branch conductor 52 and 53 is conducted via cable 12 to the control unit 15 best described in FIG. 4. The direct signal from the adapter 13 is isolated from the public address amplification system by its normal coupling.

Figure 4:
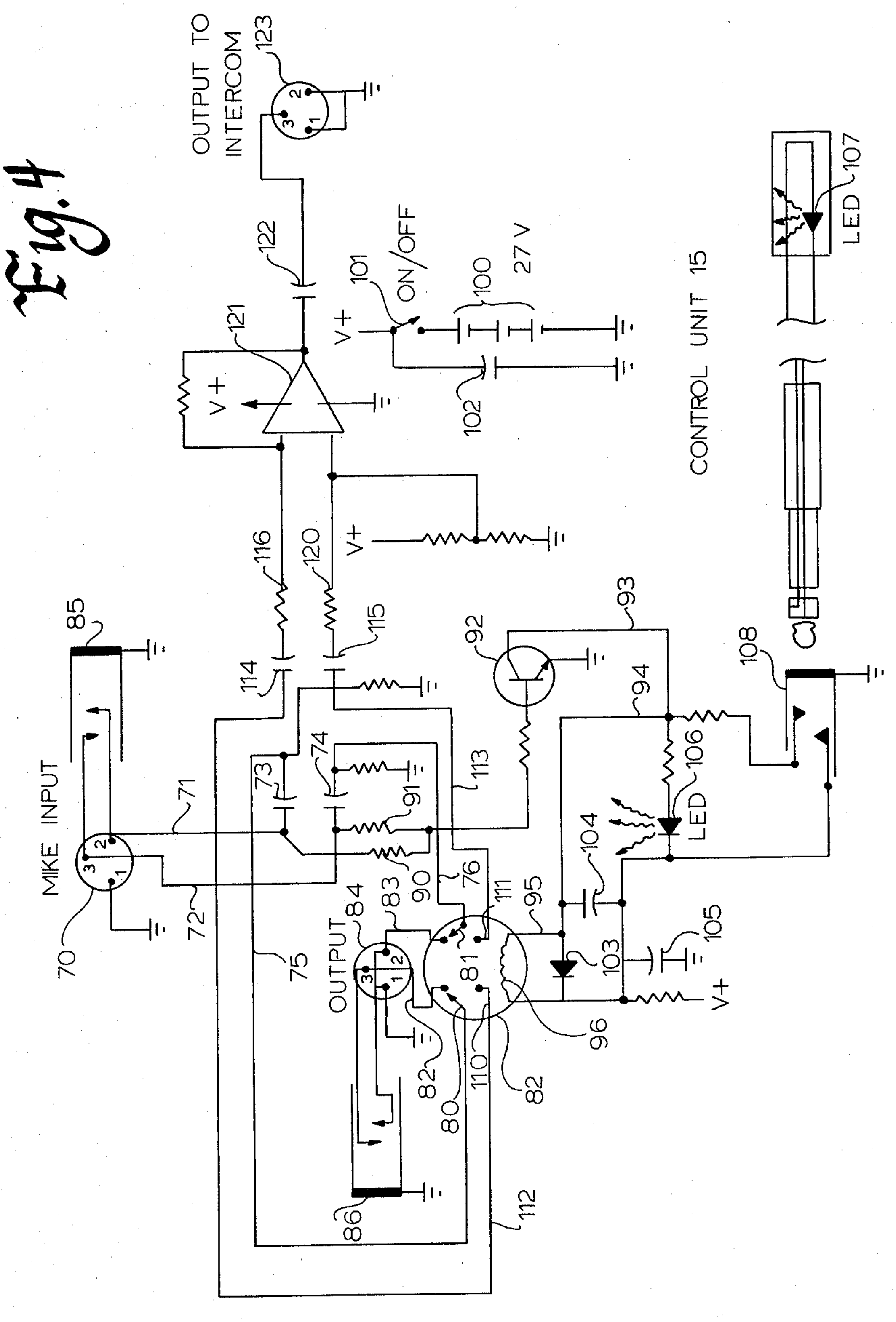
FIG. 4 is the electrical schematic diagram of the control circuitry of this invention.

Referring now to FIG. 4, which shows the electrical interconnection of the control unit 15. Cable 12 of FIG. 1 terminates in a plug which mates with jack 70 having its No. 1 terminal permanently grounded. Terminals 2 and 3 of jack 70 are connected via leads 71 and 72 and a pair of isolation capacitors 73 and 74 via conductors 75 and 76 contacts 80 and 81 of relay 82. Relay contacts 80 and 81 are normally closed and connected via leads 82 and 83 to terminals 3 and 2 respectively of an output jack 84 of the control unit 15. The output jack 84 receives a mating plug on cable 21 of FIG. 1. This is the interconnection for normal operation and provides no interference with the performers normal delivery.

Note that the jacks 70 and 84 each have connected in parallel, a phone type jack 85 and 86 respectively allowing operation in systems having that type of plug as well as the three conductor Cannon type connector disclosed in FIG. 2.

Audio frequency signals from the performer pass uninhibited through the adapter 13 of FIGS. 1 through 3 and the control unit 15 of FIGS. 1 and 4 until the switch 14 of the adapter 13 is depressed. In such case a direct current path from battery 54 of FIG. 3 is established with the direct current establishing a similar voltage drop across a pair resistances 90 and 91 in the base circuit of a switching transistor 92. The emitter of transistor 92 is grounded and its collector is coupled via leads 93, 94 and 95 to the winding 96 of relay 82 to operate that relay by the grounding of one side of relay winding 96. The opposite end of winding 15 is connected to the positive side of a power supply e.g. three 9 volt series connected batteries 100. An on/off switch 101 which enables the control unit 15 and transient bypass capacitor 102 complete the control unit 15 power supply.

The relay 82 winding circuit includes transient protecting diode 103 and capacitors 104 and 105. A visual indicator 106 such as a light emitting diode is similarly connected across the winding 96 leads. The visual indicator 106 is energized whenever transistor 92 is conducting and relay 82 operated thus signalling that the control unit 15 has switched the performer's microphone from the normal public address system to the intercommunication system. An auxilliary remote indicator such as light emitting diode 107 located separate from control unit 15 may be used by plug in connection to a jack 108 in parallel with indicator 106.

Interconnection to the intercommunication system is carried out via the front contacts 110 and 111 of relay 82 leads 112 and 113, isolating capacitors 114 and 115, resistances 116 and 120, feedback amplifier 121, coupling capacitor 122 and connector 123. The jack 123 is used to connect cable 22 of FIG. 1 to the intercommunication system.

The amplifier 121 preferably supplies in the order of 60 db of gain to the performer's signal, more that enough to power normal stage intercommunication systems with multiple stations. The indicators 106 and 108 amplifier 123 and relay 82 all require slight power drain from the battery 100. In the normal standby condition intercommunication operation is usually for short periods of time, long enough to communicate a few words. The batteries used are standard 9 volt transistor device batteries such as Eveready type 216. The adapter unit has no battery drain in standby condition allowing the use of subminiature button type buttons, such as Eveready type No. 393 BP, 1.5 v.

In carrying out this invention, we have successfully used the following components:

| | |
|---|---|
| Connectors | Cannon type |
| Relay 82 | Teledyne 732D-1000 |
| Transistor 92 | Type ECG123A |
| Amplifier 121 | Type 741 integrated circuit |
| Resistances 55, 56, 90, 91, 116, & 120 | 1 K ohm, carbon |
| Capacitancce 73, 74, 114 & 115 | 4.7 mfd |
| 102, 122 | 0.1 mfd |
| 104 | 300 mfd |
| Diodes 103 | Type 1N914 |

The above described embodiments of this invention are merely descriptive of its principles and are not to be considered limiting. The scope of this invention instead shall be determined from the scope of the following claims, including their equivalents.

What is claimed is:

1. In a stage scene including a public address system connected via a microphone cable to a performer's hand-held microphone through microphone terminals and a backstage intercommunication system, the improvement comprising:

an addition to said microphone interconnectable to the said terminals of said microphone between said microphone and said cable including a performer actuated switch means for disconnecting the microphone from the public address system and for temporarily connecting the microphone to the intercommunication system;

wherein said addition to said microphone mechanically comprises an extension to the handle of said hand-held microphone.

2. The combination in accordance with claim 1 wherein said switch means includes means for applying a predetermined non audio frequency signal to the conductors of said microphone cable connected to said microphone terminals and switching signal responsive means, normally interconnecting the microphone to the public address system and responsive to said non audio frequency signal for transferring the connection of said microphone to the intercommunication system.

3. The combination in accordance with claim 2 wherein said addition to the microphone includes a direct current source wherein said non audio frequency signal constitutes direct current supplied by said direct current source.

4. The combination in accordance with claim 2 wherein said switch means applies said non audio frequency signal to the electrical conductors of said cable connecting said microphone via said microphone terminals to the public address system.

5. The combination in accordance with claim 1 wherein said addition including conductors providing a through electrical connection between the microphone and cable at all times when connected in the system.

6. In a stage scene including a public address system connected to a performer's microphone and a backstage intercommunication system, the improvement comprising:

an addition to said microphone including a performer actuated switch means for disconnecting the microphone from the public address system and for temporarily connecting the microphone to the intercommunication system;

wherein said microphone is connected to the public address system by a cable via a plug and jack in the handle of the microphone; and wherein said addition constitutes an extension to the microphone handle having connectors at opposite ends thereof mating respectively with the microphone and cable plug or jack.

7. The combination in accordance with claim 6 wherein said addition includes a straight through electrical connection between the microphone and cable at all times when connected in the system.

8. The combination in accordance with claim 7 wherein said addition includes a battery, and said switch means selectively applies voltage from said battery across the electrical conductors constituting said straight through electrical connection between said microphone and said cable.

9. In a stage scene including a public address system connected to a performer's microphone and a backstage intercommunication system, the improvement comprising:

an addition to said microphone including a performer actuated switch means for disconnecting the microphone from the public address system and for temporarily connecting the microphone to the intercommunication system;

wherein said microphone is connected to the public address system by a cable via a plug and jack in the handle of the microphone;

wherein said addition constitutes an extension to the microphone handle having connectors at opposite ends thereof mating respectively with the microphone and cable plug or jack;

wherein said addition includes a straight through electrical connection between the microphone and cable at all times when connected in the system;

wherein said addition includes a battery and said switching means selectively applies said battery voltage across electrical conductors connecting said microphone to said cable; and includes control means interconnecting the microphone normally to the public address system and responsive to the presence of direct current on the conductors of the microphone cable for switching the microphone from the public address system to the intercommunication system;

wherein said control means includes a local power source and switching means responsive to the presence of direct current on the microphone cable conductors to apply power from said local power source to operate said switching means and transfer communications from said public address to said intercommunications system.

10. The combination in accordance with claim 10 including indicator means operative in response to the application of power to said switching means for providing an indication of the transfer of said microphone connection to said intercommunication system.

11. A microphone attachment for a microphone having a cable plugged into the handle thereof comprising a body having dimensions compatible with the handle, connectors mating with the microphone and cable and conductors extending therethrough to constitute direct interconnection electrically between the microphone and the cable;

said attachment including a power source therein and a switch actuatable by the holder of the microphone for applying electrical current to the conductors extending through said attachment whereby signals from said microphone pass through said attachment unimpeded and responsive to operation of the switch an electrical current is likewise introduced onto said conductors.

12. The combination in accordance with claim 11 wherein said power source comprises a battery.

13. The combination in accordance with claim 11 including switching means responsive to electrical current from said power source for transferring the connection for signals from said microphone from one communications channel to another.

14. The combination in accordance with claim 13 including indicator means energized responsive to the operation of said switching means.

15. The combination in accordance with claim 14 wherein said indicator means is illuminated when energized.

* * * * *